United States Patent [19]

Matsui

[11] Patent Number: 4,602,196

[45] Date of Patent: Jul. 22, 1986

[54] MEASUREMENT METHOD, AND APPARATUS THEREFOR

[75] Inventor: Mitsuo Matsui, Tokyo, Japan

[73] Assignee: Fanuc Ltd., Minamitsuru, Japan

[21] Appl. No.: 499,375

[22] Filed: May 31, 1983

[30] Foreign Application Priority Data

May 31, 1982 [JP] Japan .................................. 57-92301

[51] Int. Cl.⁴ ............................................. G05B 19/28
[52] U.S. Cl. .................................... 318/603; 364/561;
364/444; 324/323
[58] Field of Search ............... 364/561, 562, 550, 551,
364/170, 444; 73/290 R, 298, 314; 33/126,
126.5, 126.6, 126.7 R, 137 R; 324/323; 340/612,
615, 623; 318/572, 574, 578, 603

[56] References Cited

U.S. PATENT DOCUMENTS

| | | | |
|---|---|---|---|
| 3,566,478 | 6/1968 | Hurlston | 33/126 |
| 3,665,280 | 5/1972 | Payne et al. | 364/170 |
| 4,056,887 | 11/1977 | Tucker et al. | 33/126.6 |
| 4,117,600 | 10/1978 | Guignard et al. | 364/562 |
| 4,156,467 | 5/1979 | Patton et al. | 364/562 |
| 4,255,859 | 3/1981 | Klieman | 33/126.6 |
| 4,276,599 | 6/1981 | Timmons et al. | 324/323 |
| 4,345,131 | 8/1982 | Semon et al. | 318/626 X |
| 4,364,178 | 12/1982 | Huet | 33/174 |
| 4,484,118 | 11/1984 | Manabe et al. | 318/603 X |
| 4,502,126 | 2/1985 | Mizoguchi | 364/562 |
| 4,549,271 | 10/1985 | Nozawa et al. | 318/603 X |

OTHER PUBLICATIONS

Hnatek, A User's Handbook of D/A and A/D Converters, 1976, p. 245.
European Search Report, completed 8/31/83, by examiner Kunze in Vienna.

*Primary Examiner*—B. Dobeck
*Attorney, Agent, or Firm*—Staas & Halsey

[57] ABSTRACT

A method of measuring a coordinate value of a prescribed point on an object, and an apparatus for practicing the method which, includes a step of generating a signal when a measuring element contacts the object at the prescribed point. In response to the signal, a pulse distribution operation based on a commanded amount of movement is suspended. The difference between a commanded position and a positional deviation is computed by arithmetic means. The deviation is the difference between a number of commanded pulses and a number of feedback pulses. The positional deviation is cleared from the contents of an error counter, thereby stopping the measuring element. The difference computed by the arithmetic means is the coordinate value of the prescribed point on the object.

5 Claims, 2 Drawing Figures

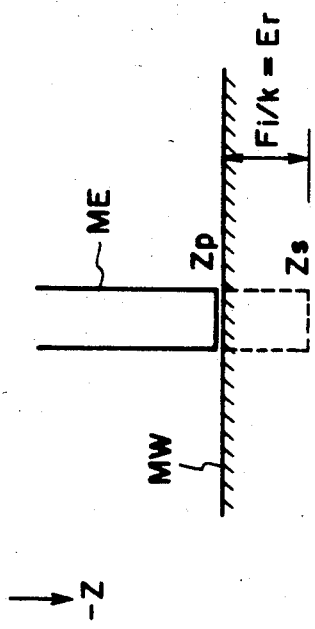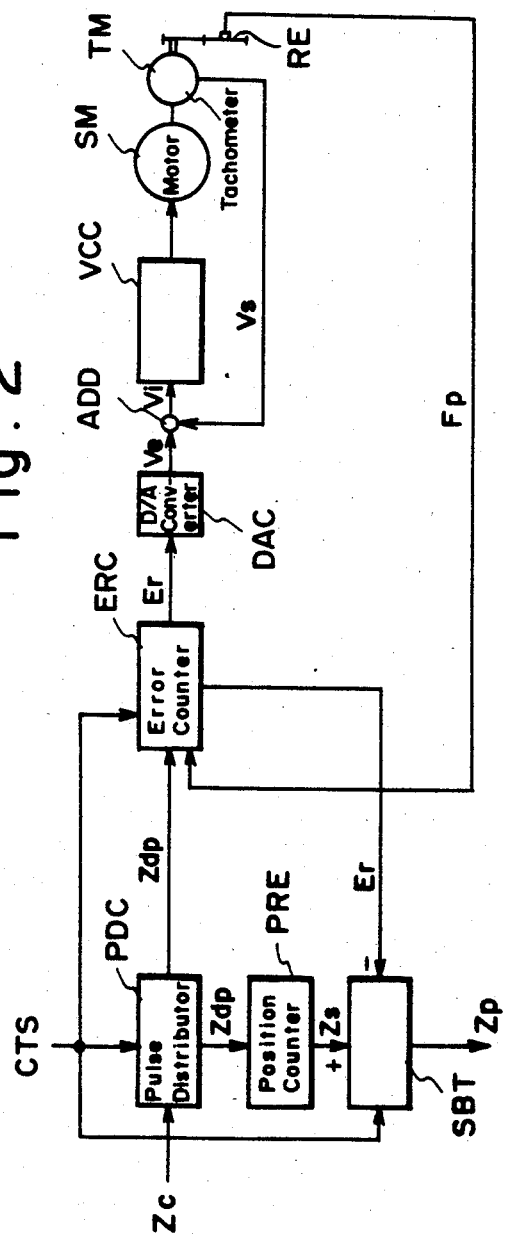

MEASUREMENT METHOD, AND APPARATUS THEREFOR

BACKGROUND OF THE INVENTION

This invention relates to a measurement method and apparatus therefor and, more particularly, to a method and apparatus for measuring the coordinates of a point on an object, or the distance to the object.

A method is available in which a measuring element is brought into contact with the surface of an object to measure the coordinates of a point on the object surface or the distance to the object. A method of measuring depth, for example, includes (a) commanding an amount of movement in excess of actual depth, (b) generating distributed pulses by performing a pulse distribution computation based on the commanded amount of movement, (c) transporting a measuring element by driving a servomotor in response to the distributed pulses, and (d) bringing the measuring element to rest after it contacts the object, and measuring the depth by relying upon the actual amount of movement the measuring element made before coming to rest.

The servo system which drives the servomotor controls the motor in such a manner that a difference (positional deviation) Er, between the number of distributed pulses and a number of pulses sensed each time the measuring element is moved by a prescribed amount, will approach zero. Specifically, assume that the distributed pulses ordinarily have a pulse rate of Fi, and that the gain of the servo system is k. In such case, the servomotor will be controlled so as to rotate with a delay equivalent to Er=Fi/k, under steady conditions, so that the delay will approach zero. The delay Fi/k (pulse number) is the difference between the number of distributed pulses and the number of sensed pulses, and is stored in an error counter. When the distributed pulses have ceased being generated, the servomotor will come to rest after rotating by an amount corresponding to the aforesaid difference (i.e., positional deviation).

The foregoing leads to a problem in the conventional measuring method, which will be understood from FIG. 1. As described above, the measuring element, represented by ME, contacts the surface of the object being measured, designated by MW. Even though the generation of distributed pulses is halted during such contact, however, the measuring element will continue to travel a distance equivalent to Fi/k (number of pulses), and will bite into the object as a result. This makes it impossible to obtain an accurate measurement of position. An attempt at a solution has been to minimize the distributed pulse rate (i.e., feed speed) Fi of the measuring element ME in order to reduce the deviation Fi/k. However, a disadvantage with this expedient is that the lower pulse rate prolongs the time needed for measurement.

SUMMARY OF THE INVENTION

Accordingly, an object of the present invention is to provide a measurement method and an apparatus therefor through which the coordinates of an object or the distance up to the object can be measured with great accuracy without prolonging measurement time.

According to the present invention, a measuring element is moved toward an object until contact is made, at which time the measuring element is stopped and a difference is computed between a commanded position and a positional deviation, the latter being the difference between the commanded position and the actual position of the measuring element. The computed difference indicates the coordinates of a point on the object, or the distance to the point, and is obtained with good accuracy without prolonging the time needed for measurement.

Other features and advantages of the present invention will be apparent from the following description taken in conjunction with the accompanying drawings.

BRIEF DESCRIPTION OF THE DRAWINGS

FIG. 1 is an explanatory view for describing a method of measurement according to the prior art, and FIG. 2 is a block diagram of an apparatus for practicing a method of measurement according to the present invention.

DESCRIPTION OF THE PREFERRED EMBODIMENT

Reference will now be made to the block diagram of FIG. 2 to describe an apparatus for practicing a measurement method according to the present invention. PDC designates a pulse distributor for producing distributed pulses Zdp by performing a pulse distribution computation on the basis of position command data Zc, namely a commanded amount of movement. The distributed pulses Zdp are applied to an error counter ERC, which also receives an input of feedback pulses Fp, each of which is generated whenever a servomotor SM for Z-axis drive rotates by a predetermined amount. The error counter ERC has its status counted up or down by the pulses Zdp, and Fp, depending upon the direction of movement, thereby recording the difference Er between the number of commanded pulses (distributed pulses) and the number of feedback pulses. This difference is referred to as a positional deviation. More specifically, when the commanded direction is forward, the error counter ERC has its status counted up each time a command pulse (distributed pulse) Zdp is generated. When the commanded direction is the reverse direction, the counter status is counted down by each command pulse Zdp. On the other hand, the error counter ERC is counted down by the feedback pulses Fp when the indicated direction of movement is in the forward direction, and is counted up by these pulses for movement in the reverse direction. The output Er of the error counter ERC is applied to a digital-to-analog converter DAC, which responds by producing a signal Ve serving as an analog speed command having a magnitude proportional to the positional deviation Er. The servomotor MS mentioned above is, e.g., a DC motor for transporting a measuring element along the Z axis. A position sensor RE, such as a rotary encoder or resolver operatively associated with the servomotor MS, produces the feedback pulses Fp, each pulse being generated whenever the motor rotates by a predetermined amount. A tachometer TM is coupled to the servomotor SM for producing a voltage Vs representing the actual speed of the servomotor, namely a voltage proportional to the rotational speed thereof. An adder ADD receives the analog speed command value Ve and the actual speed voltage Vs, which is also an analog quantity, and computes a differential voltage Vi between Ve and Vs. The differential voltage Vi is applied to a speed control circuit VCC which controls the rotational speed of the servomotor SM in such a manner that Vi will be reduced to zero.

Designated at PRE is a present position counter whose status is counted up or down, in accordance with the direction of movement, whenever a distributed pulse Zdp is generated by the pulse distributor PDC, the counter records a commanded position Zs along the Z axis at all times. The present position counter PRE applies Zs to a subtractor SBT, which also receives the positional deviation Er from the error counter ERC. The subtractor SBT computes the difference between Zs and Er by performing the arithmetic operation:

$$Zp = Zs - Er \qquad (1)$$

thereby producing a signal Zp, which indicates the Z-axis coordinate of the object MW at the point contacted by the measuring element.

The operation of the apparatus shown in FIG. 2 will now be described in greater detail. In performing a measurement, a control unit (not shown) supplies the pulse distributor PDC with the commanded amount of movement Zc for travel along the Z axis, and the pulse distributor PDC responds by performing a pulse distribution computation to produce the distributed pulses Zdp. These pulses are fed into the error counter ERC so that the pulses will be recorded in accordance with the commanded direction of movement. For example, if the commanded direction is −Z, the status of the error counter ERC will be decremented by one step each time a distributed pulse Zdp is generated. The digital status of the counter ERC is converted into the speed command, having a magnitude Ve, by the D-A converter DAC, and the adder ADD computes the difference Vi between Ve and the analog voltage Vs indicative of the actual rotational speed of the servomotor SM, the latter being driven in accordance with Vi. As a result, the measuring element, not shown, is transported along the −Z axis toward the object being measured. As the servomotor SM rotates, the position sensor RE generates one feedback pulse Fp each time the motor rotates through a prescribed angle. The feedback pulses Fp enter the error counter ERC and count up its contents. This operation continues in the manner described until the measuring element comes into contact with the surface of the object being measured.

When the measuring element contacts the object, a contact signal CTS is generated and applied to the pulse distributor PDC, error counter ERC and subtractor SBT. In response thereto, the pulse distributor PDC immediately ceases the pulse distribution operation, the contents of the error register ERC are cleared to zero, thereby halting the measuring element, and the subtractor SBT performs the operation of Eq. (1). In the subtractor, Zs is supplied by the commanded position counter PRE, the status of which was updated by the distributed pulses Zdp in the positive or negative direction, depending upon the direction of movement. Thus, by performing the operation of Eq. (1), the subtractor SBT produces a value, namely Zp, which represents the Z-axis coordinate of the object at the point contacted by the measuring element.

In accordance with the present invention as described and illustrated hereinabove, movement of the measuring element is halted, and the operation of Eq. (1) is performed, as soon as the measuring element contacts the object being measured. As a result, highly accurate measurement is possible without prolonging measurement time, the latter because it is unnecessary to minimize the feed speed of the measuring element.

While the foregoing description deals with measurement of the coordinate of a point on the surface of an object, the invention can also be applied to measure the distance up to the point.

Further, according to the foregoing description, the operation of Eq. (1) is performed in response to generation of the contact signal CTS. However, an arrangement is possible wherein the measuring element is made spherical in shape (such as the stylus used in a tracer apparatus), with the operation of Eq. (1) being performed when the magnitude of a relative displacement vector between the object and measuring element exceeds a predetermined value.

As many apparently widely different embodiments of the present invention can be made without departing from the spirit and scope thereof, it is to be understood that the invention is not limited to the specific embodiments thereof except as defined in the appended claims.

What we claim is:

1. A method of measuring a coordinate value of a prescribed point on an object by moving a measuring element, driven by a servomotor which generates feedback pulses indicative of an amount of rotation, toward the prescribed point and stopping the measuring element when it contacts the object at the prescribed point, comprising the steps of:
    (a) controlling the servomotor so that a difference between a commanded amount of movement, which moves the measuring element toward the prescribed point on the object, and an actual amount of movement of the measuring element, approaches zero;
    (b) transporting the measuring element using the servomotor;
    (c) producing an output signal when the measuring element contacts the object at the prescribed point; and
    (d) computing, at the instant the output signal is generated, a difference between the commanded amount of movement and a positional deviation, the positional direction being equivalent to a difference between a number of command pulses corresponding to the commanded amount of movement and the number of feedback pulses indicative of an amount of rotation of the servomotor.

2. A method according to claim 1, further comprising the step of stopping the measuring element when it contacts the object at the prescribed point, and wherein said step (d) includes computing the difference between the commanded amount of movement and the positional deviation by the following equation:

$$Zp = Zs - Er$$

where Zp is the difference computed in said step (d) and is indicative of a coordinate value of the prescribed point obtained when the measuring element contacts the object, where Er is the positional deviation obtained when the measuring element contacts the object, and where Zs is the commanded amount of movement.

3. A method according to claim 1, wherein the measuring element is spherical in shape, and said computing step (d) is performed when the magnitude of a relative displacement vector between the object and the measuring element attains a predetermined value.

4. An apparatus for measuring a coordinate value of a prescribed point on an object by moving a measuring element, driven by a servomotor which generates feedback pulses indicative of an amount of rotation, toward the prescribed point and stopping the measuring element when it contacts the object at the prescribed point, the servomotor being controlled by a servo system in such a manner that a difference between a commanded amount of movement and an actual amount of movement approaches zero, said apparatus comprising:

pulse distributing means, operatively connected to receive the commanded amount of movement as an input, for producing distributed pulses corresponding to the commanded amount of movement;

commanded position counting means, operatively connected to said pulse distribution means, for receiving the distributed pulses as an input and for producing a first output signal indicative of a commanded position;

error counting means, operatively connected to said pulse distributing means and the servomotor, for receiving the distributed pulses and the feedback pulses indicative of an amount of movement of the servomotor and for producing a second output signal indicative of a positional deviation equivalent to a difference between the number of distributed pulses and the number of feedback pulses; and arithmetic means, operatively connected to said commanded position counting means and said error counting means, for receiving the commanded position from said commanded position counting means and the positional deviation from said error counting means and for computing a difference between the commanded position and the positional deviation, the measuring element being halted when the difference is zero.

5. A method of measuring a coordinate value of a prescribed point on an object by moving the measuring element, driven by a servomotor which generates feedback pulses indicative of an amount of rotation, toward the prescribed point and stopping the measuring element when it contacts the object at the prescribed point, comprising the steps of:

(a) controlling the servomotor such that a difference between a commanded amount of movement for moving the measuring element toward the prescribed point on the object, and an actual amount of movement on the measuring element, approaches zero;

(b) transporting the measuring element using the servomotor;

(c) producing an output signal when the measuring element contacts the object at the prescribed point;

(d) stopping the measuring element upon contact with the prescribed point; and (e) computing, at the instant the output signal is generated, a difference signal between the commanded amount of movement and a positional deviation, the positional deviation being equivalent to the difference between the number of command pulses corresponding to the commanded amount of movement and the number of feedback pulses indicative of the amount of rotation of the servomotor.

* * * * *